United States Patent
Gradischnig

(10) Patent No.: US 7,116,774 B2
(45) Date of Patent: Oct. 3, 2006

(54) METHOD AND DEVICE FOR ROUTING MESSAGES IN SS7 NETWORKS

(75) Inventor: Klaus David Gradischnig, Reston, VA (US)

(73) Assignee: Siemens Atkiengesellschaft, Munich (DE)

( * ) Notice: Subject to any disclaimer, the term of this patent is extended or adjusted under 35 U.S.C. 154(b) by 157 days.

(21) Appl. No.: 10/652,558

(22) Filed: Sep. 2, 2003

(65) Prior Publication Data

US 2004/0137904 A1 Jul. 15, 2004

(30) Foreign Application Priority Data

Sep. 3, 2002 (EP) ................... 02019646

(51) Int. Cl.
*H04M 7/00* (2006.01)
*G01R 31/08* (2006.01)
*H04L 12/28* (2006.01)

(52) U.S. Cl. .............. 379/229; 379/230; 370/218; 370/397

(58) Field of Classification Search .............. 379/229, 379/230; 370/397, 218
See application file for complete search history.

(56) References Cited

U.S. PATENT DOCUMENTS

| 5,550,914 | A | 8/1996 | Clarke et al. |
| 6,195,425 | B1 * | 2/2001 | Farris ................ 379/230 |
| 6,449,278 | B1 * | 9/2002 | Rose ................. 370/397 |
| 6,678,242 | B1 * | 1/2004 | Simon ............... 370/218 |

FOREIGN PATENT DOCUMENTS

DE 199 30 116 1/2001

* cited by examiner

*Primary Examiner*—Wing Chan
*Assistant Examiner*—Thjuan P. Knowlin
(74) *Attorney, Agent, or Firm*—Morrison & Foerster LLP

(57) ABSTRACT

The present invention presents a flexible method for source-based message routing in a network node, particularly also suitable for flexible load distribution of the traffic via a number of link sets terminating directly at an adjacent first network element. The method uses data structures which are often already available in existing systems or are simple to set up, of providing a number of link sets between two signaling points. A two-stage routing process is initiated based on the setting up of a message node, which supports a number of logical networks or signaling point codes. In the first stage a logical network is selected, in which the message is to be routed further. In the second stage the message is routed in the selected network.

16 Claims, 2 Drawing Sheets

FIGURE 2 a.1 Stage 1 Table in NID1

| Source \ Target | HLR Prio1 | Prio2 |
|---|---|---|
| LS1–LS4 | NID1 | |
| LS5–LS8 | NID2 | NID1 | a.2 Stage 2 Table in NID1

| Target | Prio1 | Prio2 |
|---|---|---|
| HLR | LS9 | LS11 |
| MSC1 | LS1 | |
| MSC2 | LS2 | |
| MSC3 | LS3 | |
| MSC4 | LS4 | |
| MSC5 | LS5 | |
| MSC6 | LS6 | |
| MSC7 | LS7 | |
| MCS8 | LS8 | | b.1 Stage 1 Table in NID2

| Source \ Target | HLR Prio1 | Prio2 |
|---|---|---|
| LS10 | NID1 | | b.2 Stage 2 Table in NID2

| Target | Prio1 | Prio2 |
|---|---|---|
| HLR | LS10 | |
| MSC1 | LS11 | |
| MSC2 | LS11 | |
| MSC3 | LS11 | |
| MSC4 | LS11 | |
| MSC5 | LS11 | |
| MSC6 | LS11 | |
| MSC7 | LS11 | |
| MCS8 | LS11 | |

METHOD AND DEVICE FOR ROUTING MESSAGES IN SS7 NETWORKS

CLAIM FOR PRIORITY

This application claims priority to European application 02019646.5, which was filed in the German language on Sep. 3, 2002, the contents of which are hereby incorporated by reference.

BACKGROUND OF THE INVENTION

In communication networks in which the Common Channel Signaling System 7 CCS7, also referred to as SS7, standardized by the International Telecommunication Union ITU, is used in accordance with ITU-T recommendations Q.700 and later for the transmission of messages, communication between two signaling points SP, i.e. nodes and/or end points of the communication network, via connections, which in this context are referred to as signaling links or SS7 links. A node is also referred to as a signaling transfer point STP, while an end point is also referred to as a signaling end point SEP.

As disclosed in ITU-T Q.700ff, it is possible in SS7 communication networks to combine signaling links in what are known as signaling link sets. Each signaling link set comprises at least one signaling link but a maximum of 16 signaling links.

The architecture of the SS7 is also disclosed in ITU-T Q.700ff. A distinction is made between different protocol levels. Levels 1–3 form the message transfer part MTP. A number of level 4 protocols are defined in the SS7 and are referred to here as user parts UP. Examples of such are the telephone user part IUP, the ISDN user part ISUP or the signaling connection control part SCCP. Messages from these user parts are transmitted securely by the MTP.

In known SS7 implementations until now messages have been routed not in a source-related manner but purely in a destination-related manner. However it can be advantageous to route messages to one destination from different sources via different routes. This could for example be done to avoid specific message routes or to comply with business or security-related agreements. A further case for applying source-based message routing occurs when a number of link sets are provided between two nodes, for example between a signaling transfer point STP and a home location register HLR, due to a high level of expected load.

A number of link sets can be provided between two signaling points to increase the maximum number of links and therefore the transmission capacity between these two signaling points (a link set can have a maximum of 16 links). In such a case the traffic from the STP to the HLR is to be distributed to the individual link sets in a source-based manner in order to distribute the load. A further problem can then arise if the link sets, of which there are more than one, between the signaling points are implemented according to the standard. As, according to the ITU standard, only one link set can be provided in an MTP network between two signaling points, the link sets, of which there are more than one, must in this case be associated in at least one of the signaling points, advantageously in the STP, with different logical message transfer part MTP networks. The further problem then arises of how a message, which was received in one network, can be forwarded via a link set in a different network.

Similarly messages can only be forwarded by the MTP in an STP in the network in which they were received. The following techniques are also known:

Screening functions, for example according to ITU-T Q.705, allow differentiation so that for example messages from a specific source or from a specific link set may not be routed to specific destinations. This function can be linked to a charge function. Both sources and link sets as well as destinations can then be combined in groups, which are processed in the same way. This method however only allows a yes/no decision and usually all messages (except for the outgoing link set/DPC screening removed from Q.705 due to problems with route planning), which are subject to the screening function, are each routed to one destination in an identical manner.

A further known method involves not allowing or only to some extent allowing alternative routes to specific destinations for traffic not originating in the particular node, known as foreign traffic. The procedure here is such that, if a higher priority alternative route to a destination is not authorized for foreign traffic, lower priority routes to the same destination are not authorized either. This results in the significant restriction that higher or highest priority routes are used regardless of source, and route priority, if permitted, is identical.

A method is also disclosed in EP 1 130 930, with which link sets are divided into groups and with which the routes to a destination permitted for a message depend on the association of the source, i.e. the link sets, at which the message was received, with a group. This also results in the restriction that higher or highest priority routes are used regardless of source, and route priority, if permitted, is identical.

A check is also known, which ensures that messages from one link set are not forwarded again via the same link set (avoiding what are known as ping-pong loops). However this only serves to prevent errors, not to route in a source-based manner. WO99/55098 and WO00/11883 also disclose how messages can cross MTP network boundaries in a node via physical or virtual tunnels. They also disclose how certain screening functions can be achieved with these methods. However they do as little to achieve a solution to source-based routing as the screening functions. The problem of crossing network boundaries is however resolved. However the two solutions have the following disadvantages:

All the messages arriving in a network are forwarded via the same networks or the same other network, so source-based routing can only be achieved to a very limited extent.

The physical tunnels according to WO99/55098 also have the disadvantage that they use physical resources, by connecting two logical networks via one physical link set. In addition to the disadvantageous use of resources, the traffic between the two networks is also restricted with regard to volume as a result.

The virtual tunnels also have the disadvantage that setting them up fully according to standards—particularly for MTP network management—can be very expensive for existing implementations.

It is also possible to define routing tables based on source or based on the link set of incoming messages. This method is the most flexible but it requires a great deal of storage capacity for the routing tables and very complex and time-consuming network management, partly because a large number of routing tables have to be changed after events which require routing table changes. The implementation of such a function, particularly in existing systems, is also expensive and complicated. Nor does it result in the crossing of network boundaries.

Finally a development of the above method is known, which, unlike the ITU standard, provides a number of logical addresses in a node in a logical network, said addresses being known here as signaling point codes SPC, from each of which separate link sets can lead to a specific adjacent node and in which incoming messages can be routes in a source-based manner. This method may resolve all the problems listed but it is extremely uneconomical with regard to use of resources and set-up costs. This is particularly true of existing systems.

SUMMARY OF THE INVENTION

The present invention specifies a method which uses data structures, which are already available in existing systems or are simple to set up, to allow source-based routing.

The present invention discloses a method, which is suitable for flexible load distribution of traffic via a number of link sets LS9, LS10 terminating directly at an adjacent first network element HLR, for source-based message routing in a network node STP, which advantageously uses data structures which are often already available in existing systems or are simple to set up.

A two-stage routing process is initiated, based on the setting up of a message node STP, which supports a number of logical networks NID1, NID2. In a first stage a logical network is selected, in which the message is to be routed further. In a second stage the message is routed in the selected network. Preferably, the network selected for the second stage is not identical to the network to which the link set belongs, via which the message was received.

The use of logical networks in a node STP here does not necessarily mean that different real networks actually exist. Rather it is possible for the logical networks, which are different from the point of view of the node STP, to share the addressing capacity of a shared real network.

The source, e.g. communication address of the source node and/or incoming link set and the communication address of the destination node of the message can be used to select the (logical) network required for the second stage. Naturally both sources and destinations can each be combined in groups, in order to simplify management and save resources. It can also be advantageous if this selection does not provide a single network for the second stage but a prioritized list of networks. The second stage of routing is then implemented in the highest priority network in the list, in which a route to the destination is currently available. It is also possible to forward the message stream via more than one of the networks, by for example selecting one of two or more otherwise equivalent networks (networks with available routes to the destination and the same priority in the list) for forwarding by means of the SLS value in the message or a different feature of the message.

To set up the first stage, it is advantageous if existing administratable data structures already available to the message routing process can be extended accordingly. If the data structures already have capacity for the required data, it is only necessary to adapt the administration process, in order to be able to input the required data into the data structure. In many cases this can be done in existing systems for example by means of a single patch or software update.

Adaptation of the message routing process to the two-stage routing method for actual routing is generally very simple and can usually be initiated in existing systems by means of a simple, central patch.

An extension of MTP network management may be required in conjunction with the present invention. As network management often imposes specific requirements in respect of the routing of network management messages, it often routes messages directly, without using the standard message routing process. The problem now arises that the data structures used for the first stage are not available for network management. Even if these data structures were available, adaptation would be required at a number of points. A further problem for network management is that it uses the routing tables not only for actual routing but also to control specific actions, e.g. to determine which adjacent nodes have to be informed about the accessibility of a destination.

There are a number of options for avoiding network management adaptations. Either the relevant network management components or functions are dispensed with completely or restricted network management is implemented.

If the selected routing concept is based for example on source nodes/destination nodes, route management (by means of the MTP messages TFP, TFA, RST etc.), which is only based on incoming link set/destination nodes, is not possible. Adaptation of congestion management (TFC messages) is either not implemented or is simply possible, as in many cases it is executed directly by the message routing process, as it depends on the status of the selected links.

If the selected routing concept is based for example on an incoming link set/destination node, the message routing process can for example implement restricted route management. If it is determined that a destination is not available via any of the networks to be used, the adjacent node, from which the message was received, is informed directly by means of a transfer prohibited TFP message about the inaccessibility of the destination. In this case, the message routing process also processes and where necessary responds with a transfer allowed TFA message to those route set test RST messages which relate to a message stream using the two-stage routing process and by means of which the adjacent nodes test the re-availability of a destination. It may not be necessary to inform the adjacent nodes about the accessibility of such destinations by what is known as the broadcast method (see Q.704). Adaptation of congestion management (TFC messages) in this case is also simply possible or it is dispensed with.

In cases in which the messages from all incoming link sets of a logical network can access all destinations via the same (logical) network(s), whereby the priority sequence of these networks can be different for each incoming link set, full standard-compliant network management can take place without set-up costs, i.e. without adapting the network management process and without network management activities being taken over by the message routing process, as described below.

Such a restriction can, in many cases, be extremely expedient. These are for example cases, in which an MTP network transition is to be effected simply as referred to above. Another case involves source-based two-stage routing being used for load distribution as mentioned above. Here it is even desirable to have the option of routing messages to a destination, as long as there is still a connection from any logical network to the destination.

The setting up process takes place on the one hand by adapting the message routing process to route as described above. Also physical tunnels according to WO99/55098 are established between those networks which are connected via two-stage routes (via virtual tunnels). Now routes via the physical tunnels are also set up in the actual routing tables for destinations in a network which are reached via a different network selected by the first stage of the routing process according to the invention. With the conditions listed above, the accessibility of a destination does not depend on whether it is accessed via the virtual tunnels, i.e. the first stage of the new routing process or via the physical tunnels, i.e. the actual routing matrix. This means on the one hand that messages which are routed past the actual routing process, for example network management messages, access destinations which are accessible via the virtual tunnels. On the other hand, route management is implemented fully. If a destination in a logical network is no longer available or becomes available again, the logical networks connected via physical tunnels are also informed of thee status changes, so that network management is also fully functional across the logical network boundaries. While the majority of the messages therefore take the efficient route via the virtual tunnels, network management messages can use the physical tunnels. The latter only have small loads to carry and therefore use correspondingly few static and dynamic resources.

The method described above is referred to as a hybrid network tunnel or hybrid connection group, allowing a transition between logical MTP networks, with the hybrid connection groups or tunnels combining the advantages of the physical tunnels (WO99/55098, simplest set-up) with those of the virtual tunnels (WO00/11883, minimum static and dynamic resource requirement).

BRIEF DESCRIPTION OF THE DRAWINGS

The invention is described in more detail below using two figures as examples. In the figures.

FIG. 2 shows the routing matrix of the network node STP from FIG. 1.

DETAILED DESCRIPTION OF THE PREFERRED EMBODIMENTS

Figure 1:
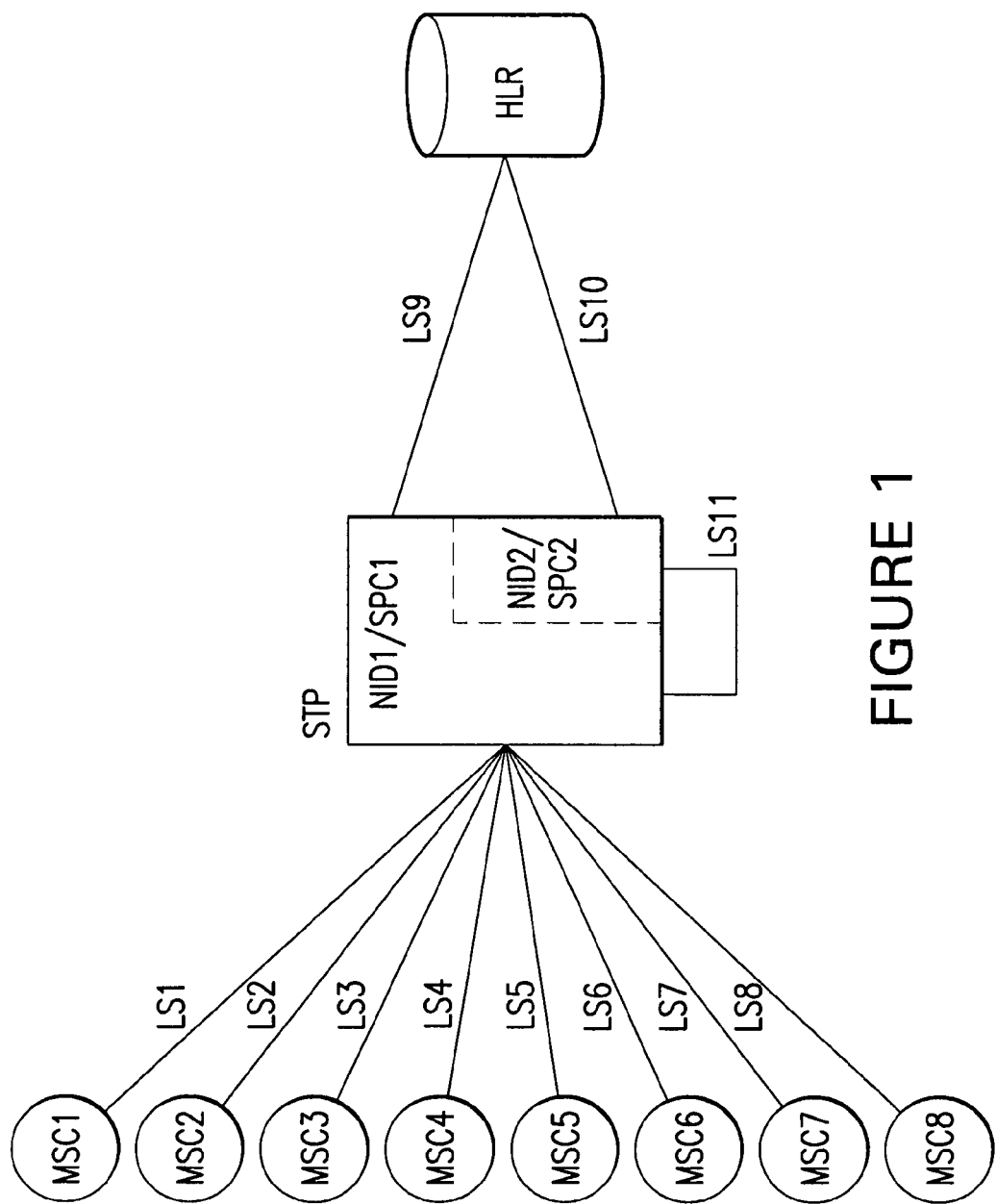
FIG. 1 shows a network situation, in which the present invention can be advantageously applied.

FIG. 1 shows a simplified SS7 network. Eight mobile switching centers MSC1 . . . MSC8 are connected via a signaling transfer point STP to a home location register HLR. The diagram is a simplified diagram in that there are usually further nodes in an SS7 network, e.g. further STPs, further signaling endpoints SEP, further HLR and/or other network elements. The configuration shown in FIG. 1 is therefore given as an example to clarify the doctrine according to the invention but should not be seen as restrictive in respect of the invention.

The invention is, for example, essential if the traffic for example going out from MSC1 . . . MSC8 is so heavy between STP and HLR that a single link set LS9, which is known to have a maximum capacity of 16 links, can no longer transport this traffic. According to the invention, a second logical network NID2 or a second signaling point code SPC2 is set up in the STP, with the second logical network NID2 or the second signaling point code SPC2 being connected to the HLR via a second link set LS10.

MSC1 . . . MSC8, which also communicate with each other, are connected to the STP by means of eight link sets LS1 . . . LS8 and all terminate in one network NID1 in the STP. Although the characteristic that all link sets terminate in the same network NID1 has advantages, selected link sets can terminate in other networks—not shown. The principles described do not change as a result, the routing matrices simply become more complex, in order to take into account the more complex structure of the network.

One link set LS11 is provided between NID1 and NID 2. This link set is preferably physical and comprises for example two links, in order to be resistant to individual instances of failure.

In the STP MSC1 . . . MSC8 are divided into two groups for example using the incoming link set. Traffic from a first group MSC1 . . . MSC4 is sent primarily via the second logical network NID1 to the HLR and via the second logical network NID2 when the routes into NID1 are not available. Traffic from a second group MSC5 . . . MSC8 is sent primarily via the second logical network NID2 to the HLR and via the first logical network NID1 when the routes into NID2 are not available.

This selection is made according to stage 1 of routing table a.1 in FIG. 2. Messages, the source/destination combination of which is not included in the stage 1 table, for example messages which are exchanged between MSC1 . . . MSC8, are routed according to the stage 2 table a.2 in FIG. 2. Both the direct link set LS9 and the physical or virtual tunnel LS11 are provided here for the destination HLR. The direct link sets are provided in each instance as a route for messages to the MSC1 . . . MSC8.

There are also stage 1 and 2 routing tables in the second logical network NID2. The table b.1 for stage 1 specifies the first network NID1 as the primary and sole network for all messages from link set LS10 with the destination MSC1 . . . MSC8. The table b.2 for stage 2 specifies the link set LS10 as the route for the destination HLR and the link set LS11 as the route for the destinations MSC1 . . . MSC8.

In known systems existing data structures for what is known as the incoming link set/DPC screening can advantageously be used to apply the stage 1 tables, by extending an existing parameter, which specifies the processing of a message detected by the screening, to include the routing data.

The invention can be used without modification for all versions of SS7 networks, in particular for conventional SS7 networks, in which traditional time-division multiplex TDM links are used. The invention can also be used for SS7 networks, which are mapped by corresponding methods onto internet protocol. IP networks, with which for example IP connections or IP links are used instead of TDM links and with which signaling points SP A . . . F are linked by means of IP to a communication network. Other transport media or transport protocols for SS7 can similarly be used in conjunction with the present invention.

It is self-evident that instead of the two logical networks NID1, NID2 or signaling point codes SPC1, SPC2 described, a number of networks or SPCs can be provided for the node STP, if for example the traffic to be carried exceeds the capacity of the two link sets LS9, LS10 shown as an example. The routing tables then have to be adapted according to the exemplary embodiment and this can easily be done based on the principles described in conjunction with the exemplary embodiment.

It should also be noted that other criteria or parameters can be used to select one of the logical networks or signaling point codes for forwarding messages in the STP, said criteria or parameters characterizing the source of a message. A combination of the principle according to the invention and known mechanisms for message routing and/or load distribution can be implemented without modification.

What is claimed is:

1. A method for routing messages in a node of a communication network, where the node, a first network element and additional network elements are components of a first logical network, and at least the node is a component of at least one second logical network, comprising:

connecting the node via at least one first connection group in the first logical network and via at least one second connection group to the first network element;
connecting the node via at least one additional connection group to the additional network elements; and
selecting, for transmission of the messages from the additional network elements to the first network element, the first connection group or the second connection group, based on source identification of the additional network element sending the message.

2. A method for routing messages in a node of a communication network, comprising:
transferring, via the node, the message between a first network element and network elements;
connecting the node via one first connection group and via at least one second connection group to the first network element;
connecting the node via at least one additional connection group to the additional network elements;
providing at least two communication addresses for communication between the node and the first network element in the node, with each communication address being associated with one of the connection groups between the node and the first network element; and
selecting, for transmission of the messages from the additional network elements to the first network element, the first connection group with an associated first communication address or the second connection group with an associated second communication address, based on source identification of the additional network element sending the message.

3. The method according to claim 1, wherein the source identification is established by an address unambiguously characterizing each of the additional network elements or by unambiguous identification of the additional connection group, via which a message was received or by a combination of the address and identification.

4. The method according to claim 1, wherein in a first stage one of the logical networks or one of the communication addresses is selected in the node for the transmission of messages to the first network element, and
in a second stage, the connection group with a highest priority, which is in service, is selected according to a list applicable to the first stage selection and taking into account priorities of the connection groups in each instance.

5. The method according to claim 4, wherein for the first stage selection sequence fields or other fields or features of the message to be transmitted are taken into account.

6. The method according to claim 1, wherein messages between the first and second logical networks or the communication addresses are transmitted via an internal or external or hybrid connection group in respect of the node.

7. The method according to claim 1, wherein the signaling system 7 SS7 is provided in the communication network, with the first network element and the additional network elements being signaling points and the node being a signaling transfer point and the connection groups being signaling link sets, each of which is formed by at least one signaling link.

8. A signaling transfer point of an SS7 network, comprising:
a first unit for sending and receiving messages from a first signaling point via a first link set and at least one second link set;
a second unit for sending and receiving messages from additional signaling points via additional link sets; and
a third unit for routing messages, which are configured to route messages based on characteristics of the signaling point sending the message to the first signaling point via one link set from among the available link sets.

9. The signaling transfer point according to claim 8, wherein the first unit comprises a first logical network and at least one second logical network, with at least the second link set being associated with the second logical network and the additional link sets being associated with the first logical network.

10. The signaling transfer point according to claim 8, the first unit comprises a first signaling point code and at least one second signaling point code, with at least the second link set being associated with the second signaling point code and the additional link sets being associated with the first signaling point code.

11. The signaling transfer point according to claim 9, the third unit comprises the following:
at least one first priority table for selecting the logical network or the signaling point code based on an origination point code of a received message or on an identifier of the incoming link set or a combination of the origination point code and identifier and on a destination point code of a received message;
a selection unit for determining the logical network or the signaling point code based on the first priority table, with the selection unit being configured to take unavailable logical networks or signaling point codes into account;
a transfer unit for forwarding the message to be transmitted to the selected logical network or the selected signaling point code;
at least one second priority table for selecting the outgoing link set; and
a an additional selection unit for determining an outgoing link set based on the second priority table, with the additional selection unit being configured to take unavailable link sets into account.

12. The method according to claim 2, wherein the source identification is established by an address unambiguously characterizing each of the additional network elements or by unambiguous identification of the additional connection group, via which a message was received or by a combination of the address and identification.

13. The method according to claim 2, wherein in a first stage one of the logical networks or one of the communication addresses is selected in the node for the transmission of messages to the first network element, and
in a second stage, the connection group with a highest priority, which is in service, is selected according to a list applicable to the first stage selection and taking into account priorities of the connection groups in each instance.

14. The method according to claim 13, wherein for the first stage selection sequence fields or other fields or features of the message to be transmitted are taken into account.

15. The method according to claim 2, wherein messages between the first and second logical networks or the communication addresses are transmitted via an internal or external or hybrid connection group in respect of the node.

16. The method according to claim 2, wherein the signaling system 7 SS7 is provided in the communication network, with the first network element and the additional network elements being signaling points and the node being a signaling transfer point and the connection groups being signaling link sets, each of which is formed by at least one signaling link.

* * * * *